United States Patent
Takada et al.

(10) Patent No.: US 7,408,604 B2
(45) Date of Patent: Aug. 5, 2008

(54) METHOD FOR MANUFACTURING SURFACE PROTECTIVE FILM FOR TRANSPARENT CONDUCTIVE FILM

(75) Inventors: Shinichi Takada, Ibaraki (JP); Kazuhito Okumura, Ibaraki (JP); Mitsushi Yamamoto, Ibaraki (JP); Masaki Hayashi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 560 days.

(21) Appl. No.: 11/189,523

(22) Filed: Jul. 26, 2005

(65) Prior Publication Data
US 2005/0259202 A1 Nov. 24, 2005

Related U.S. Application Data

(62) Division of application No. 10/619,516, filed on Jul. 14, 2003, now abandoned.

(30) Foreign Application Priority Data

Jul. 31, 2002 (JP) .............................. 2002-223356

(51) Int. Cl.
*G02F 1/1333* (2006.01)
*B32B 9/00* (2006.01)

(52) U.S. Cl. ...................... 349/122; 428/354
(58) Field of Classification Search ................ 349/122, 349/45, 138; 428/354, 483; 359/490
See application file for complete search history.

(56) References Cited

U.S. PATENT DOCUMENTS

| 6,899,949 B2 * | 5/2005 | Imono et al. ................ 428/354 |
| 7,326,374 B2 * | 2/2008 | Hatanaka et al. ........... 264/1.34 |
| 2006/0098137 A1 * | 5/2006 | Kameyama et al. .......... 349/96 |

FOREIGN PATENT DOCUMENTS

| JP | 7-66691 | 3/1995 |
| JP | 7-68690 | 3/1995 |
| JP | 11-268168 | 10/1999 |
| JP | 11-320744 | 11/1999 |
| JP | 2000-26814 | * 1/2000 |
| JP | 2001-332132 | 11/2001 |

OTHER PUBLICATIONS

Merriam Webster's Collegiate Dictionary 10th Ed. (pp. 435, 1089 and 1094)(copyright 1999).

* cited by examiner

*Primary Examiner*—Dung T. Nguyen
(74) *Attorney, Agent, or Firm*—Knobbe Martens Olson & Bear LLP

(57) ABSTRACT

A method is to manufacture a surface protective film for transparent conductive films having a rate of thermal shrinkage of no more than 0.9% in both MD (machine direction) and TD (width direction) as measured after being heated at 150° C. for 1 hour. The method includes: providing a base material film; applying an adhesive on one surface of the base material film; and applying a drawing tension of no more than 80 N per width of 1 m of the base material film under conditions of a temperature of 100° C. through 150° C. and a residence time of 20 through 120 seconds, thereby removing a residual stress and simultaneously drying the adhesive.

10 Claims, 1 Drawing Sheet

METHOD FOR MANUFACTURING SURFACE PROTECTIVE FILM FOR TRANSPARENT CONDUCTIVE FILM

CROSS-REFERENCE TO RELATED APPLICATIONS

This application is a divisional of U.S. patent application Ser. No. 10/619,516, filed Jul. 14, 2003 now abandoned, the disclosure of which is incorporated herein by reference in its entirety.

BACKGROUND OF THE INVENTION

1. Field of the Invention

The present invention relates to a surface protective film used for transparent conductive films and transparent conductive films with a surface protective film that are widely used in a field of a transparent electrode and the like, such as liquid crystal displays, touch panels, sensors, and solar cells.

2. Description of the Related Art

In general, thin films having transparency in visible radiation region and conductivity are used in transparent electrodes in new displays for liquid crystal displays, electroluminescence displays, etc., in touch panels, etc. and further in electrification prevention and electromagnetic wave interception, etc. for transparent goods. For example, in manufacturing process for touch panels by electric conductive film contact type where transparent electrodes of transparent substrates having transparent electrode with transparent conductivity are arranged facing each other on one side, various kinds of complicated and long treating processes and assembling processes, such as cutting of the transparent conductive film, printing of resists, etching, printing of silver ink, and further delivery after arranging transparent electrodes of two sheets of conductive films facing each other are usually carried out.

In manufacturing processes of touch panels, surface protective films are conventionally used in order to prevent occurrence of soil, and scratch, and others in transparent conductive films. As mentioned above, however, since touch panels have complicated and long manufacturing process, different kinds of surface protective films are newly replaced and used for each manufacturing process, in other words, different surface protective films are properly used for different manufacturing processes. Accordingly, manufacturing process becomes complicated very much and deterioration in working efficiency and in yield raises manufacture cost.

Therefore, unification of variety of surface protective films used in a manufacturing process of touch panels has been strongly desired. As characteristics required for unification of variety of the films, there may be mentioned heat resistance, which does not melt a base material of the surface protective film in a heating process at about 150° C. required for drying process for silver ink printing during touch panel manufacturing processes. Since conventional surface protective films of polyolefin based materials, such as low density polyethylenes and polypropylenes, gives problems of melting or large deformation, they cannot be used for the above-mentioned heating processes. On the other hand, in use of films having outstanding heat resistance, such as polyethylene terephthalate resin films, which does not melt in heating process at about 150° C., new problem occurs. That is, a difference in a rate of thermal shrinkage by heating between a transparent conductive film and a surface protective film curls the transparent conductive film with the surface protective film attached thereon (here, curling represents a phenomenon of deformation into concave shape with upper surface protective film facing inside). This curling phenomenon deteriorates workability on manufacturing process. And furthermore, when a direction of the curling faces a side opposite to the transparent electric conductive film, a large problem occurs in quality of touch panel that deformation by the curling will contact both electrodes of upper electrodes and lower electrodes in the transparent electric conductive film.

SUMMARY OF THE INVENTION

An object of the present invention is to provide a solution for the above-mentioned conventional problems, and to provide a surface protective film for transparent conductive films that prevents large curling for the transparent conductive films with the surface protective film attached thereon in heating process at about 150° C., and a method for manufacturing the same. Besides, this invention aims at providing a transparent conductive film with the surface protective film.

As a result of wholehearted research performed by the present inventors in order to attain the above-mentioned purpose, it was found out that the above-mentioned problem may be solved using a surface protective film having a specific rate of thermal shrinkage, and it led to completion of this invention.

That is, a surface protective film for transparent conductive films of this invention is a film that protects a surface of a side opposite to a conductive thin film or a surface on a side of the conductive thin film of the transparent conductive film, and it is characterized in that an adhesive layer is formed on one side of a base material film, and that a rate of thermal shrinkage after being heated at 150° C. for 1 hour shows no more than 0.9% in both MD (machine direction) and TD (width direction). Here, the rate of thermal shrinkage is a value specifically measured by a measuring method described in Example.

When a rate of thermal shrinkage after being heated at 150° C. for 1 hour of a surface protective film exceeds 0.9%, a transparent conductive film with the surface protective film attached thereon greatly curls, which is not preferable on work or quality.

In this invention, a rate of thermal shrinkage of a surface protective film after being heated at 150° C. for 1 hour is preferably no more than 0.6% in an MD direction and no more than 0.1% in a TD direction, and most preferably 0% in both of MD and TD directions.

On the other hand, a transparent conductive film with a surface protective film of this invention comprises a conductive thin film on one side of a surface of a base material film, and a hard coat layer or an anti-glare layer on the other side, and at the same time, an adhesive layer of the above-mentioned surface protective film for the transparent conductive film is attached on a surface of the above-mentioned hard coat layer, anti-glare layer, or on a surface of the conductive thin film.

Furthermore, another transparent conductive film with a surface protective film of this invention comprises a conductive thin film on one side of a base material film, and at the same time, an adhesive layer of the above-mentioned surface protective film for a transparent conductive films is attached on the other side of the base material film, or on a surface of the conductive thin film.

Function and Effect

In a surface protective film for transparent conductive films of the present invention (abbreviated as "surface protective film" for short hereinafter), the transparent conductive film with the surface protective film attached thereon does not provide large curling after heating process. Accordingly, it may be subjected to a subsequent heating process in a state where the surface protective film is attached to an adherend (a surface opposite to a conductive thin film of a transparent conductive film, or a surface on a side of conductive thin film), which can protect the adherend from scratch or soil during the heating process. Although time and effort for attaching and changing conventional surface protective films before and after the heating process was needed in conventional processes, the surface protective film may be subjected to the following heating process in a state being attached on adherends. Thereby, time and effort for attaching and exchanging the surface protective film may be saved, leading to remarkable improvement in workability, and suppression of manufacturing cost.

In this invention, it is preferable that a treatment for removing a residual stress to the above-mentioned base material film is performed. The treatment for removing a residual stress performed to the base material film of a surface protective film reduces a rate of thermal shrinkage, controlling occurrence of the curling. A rate of thermal shrinkage of a surface protective film in which a residual stress of the above-mentioned base material film has been completely removed theoretically shows 0%, and does not provide large curling as a result. Even if some curling occurs, in case of touch panel intended use, it will curl to a side of a transparent electric conductive film, and therefore, even when being arranged so that an upper electrode and a lower electrode may face each other, a problem in quality of contact of both electrodes will not arise.

Practical method for removing a residual stress from a base material film in manufacturing a surface protective film may be roughly divided into two methods: a method in which heat-treatment is given to a base material film before coated by a adhesive without applying a drawing tension as much as possible; and a method in which heat-treatment is given to a base material film after coated by a adhesive without applying drawing tension as much as possible in a drying process of the adhesive. Latter method is preferable in consideration of point of excelling in cost reduction by simplification of a manufacturing method, and an anchoring property of the adhesive into the base material film.

Besides, it is preferable that the base material films for the surface protective film are films including polyethylene terephthalates and/or polyethylene naphthalates. Practically sufficient transparency and practically sufficient strength may be obtained using the polymers.

Furthermore, this invention relates to a method for manufacturing a surface protective film for transparent conductive films, wherein after a adhesive being applied to one side of a base material film, a drawing tension of no more than 80 N per width of 1$m$ of the base material film is applied under conditions of a temperature of 100 through 150° C., and a residence time of 20 through 120 seconds, and thereby a treatment for removing a residual stress and simultaneous drying of the adhesive is performed.

DETAILED DESCRIPTION OF THE PREFERRED EMBODIMENT

Figure 1:
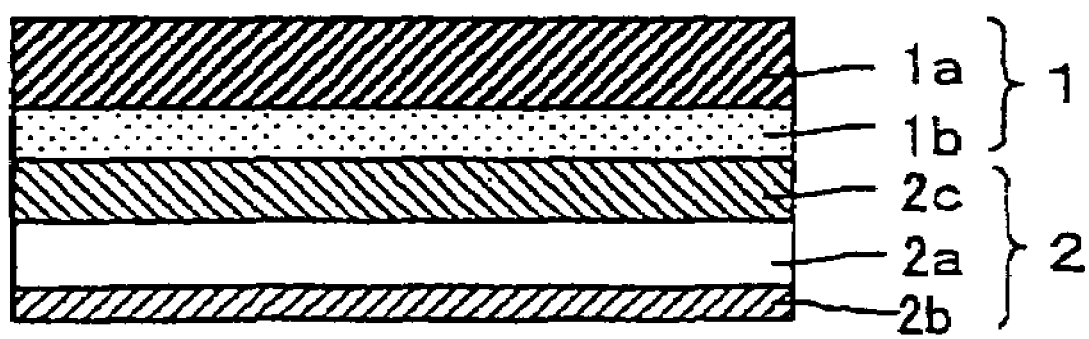
FIG. 1 is a sectional view showing an example of used condition of a surface protective film for transparent conductive film of the present invention.
Figure 2:
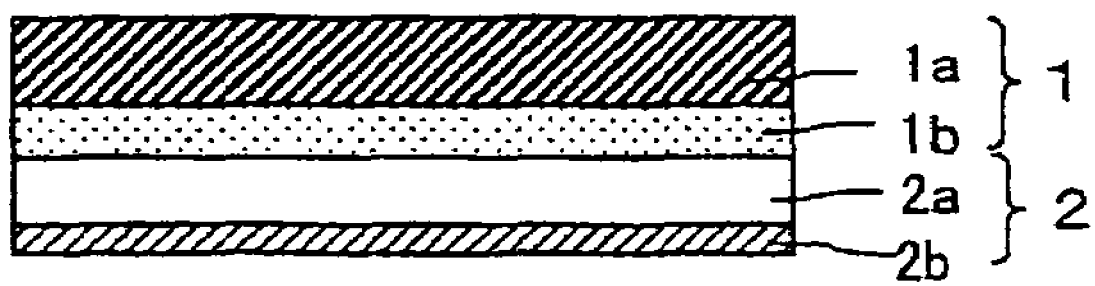
FIG. 2 is a sectional view showing another example of used condition of a surface protective film for transparent conductive film of this invention.

Hereinafter, description will be given about embodiments of the present invention, referring to drawings. FIG. 1 is a sectional view showing an example of used condition of a surface protective film of this invention, and FIG. 2 is a sectional view showing an another example of used condition.

In a surface protective film of this invention, as shown in FIG. 1, an adhesive layer 1$b$ is formed on one side of a base material film 1$a$. The surface protective film of this invention protects a surface opposite to a conductive thin film of a transparent conductive film, or a surface on a side of the conductive thin film. An embodiment shown in FIG. 1 shows an example in which a surface protective film 1 is attached on a surface of a hard coat layer 2$c$ (or the above-mentioned anti-glare layer) of a transparent conductive film 2, and an embodiment shown in FIG. 2 shows an example in which a surface protective film 1 is attached on a surface of a substrate film 2$a$ of a transparent conductive film 2.

Base material films 1$a$ are not especially limited as long as they have transparency practically required for intended uses for optics, and as long as a surface protective film obtained by being given an adhesive layer on one side of the base material films has a rate of thermal shrinkage satisfying the above-mentioned range. Among examples are: polyesters, such as polyethylene terephthalates (PET) and polyethylene naphthalates (PEN); polyphenylene sulfides (PPS), polycarbonates, polyetheretherketones (PEEK), polymethylmethacrylates, polystyrenes, polyvinyl chlorides, polyethylenes, polypropylenes, blended material of polyethylenes/polypropylenes, polyamides, polyimides, cellulose propionates (CP), cellulose acetates, polysulfones, polyethersulfones, etc. Especially, in view of transparency, heat resistance, and strength PET and PEN are preferable, and PET is more preferable in respect of low price and high versatility.

In conditions for removing a residual stress of a base material film of PET as raw material component, a drawing tension is set no more than 80 N, preferably no more than 60 N, more preferably no more than 30 N, most preferably 0 N per base material film width of 1$m$, a temperature is set 100 through 150° C., and preferably 120 through 150° C., and a residence time is set 20 through 120 seconds, and preferably 40 through 120 seconds, and more preferably 60 through 120 seconds.

A thickness of a base material film 1$a$ is not especially limited, and it is preferably about 10 through 70 μm, more preferably about 15 through 50 μm, and still more preferably about 20 through 40 μm. Excessively small thickness gives tendency for strength to be inadequate at a time of separation of a surface protective film 1 and for surface protection function to be inferior. And on the other hand, excessively large thickness gives a tendency to be disadvantageous in respect of handling property or cost. In the base material film 1$a$, in view of anchoring property between an adhesive layer 1$b$, treatments by corona discharge, electron beam irradiation, sputtering methods, etc. and an adhesion-enhancing treatment are preferably performed on the surface of the base material film.

As adhesives forming the adhesive layer 1$b$, usually used adhesives for re-peeling (acrylics based, rubber materials based, synthetic rubbers based, etc.) may be used without particular restriction. Acrylic based adhesives whose adhesive power may be easily controlled based on compositions are preferable.

A weight average molecular weight of base polymers of acrylic based adhesives is preferably approximately 300,000 through 2,500,000. Various alkyl (meth)acrylates may be used as monomers used for acrylic based polymers as base polymers of the acrylic based adhesives. As examples of the alkyl (meth)acrylates, methyl (meth)acrylate, ethyl (meth) acrylate, butyl (meth)acrylatel, and 2-ethylhexyl (meth)acrylate etc. may be mentioned, and moreover they may be used independently or may be used in combination.

As acrylic based adhesives, a copolymer in which monomers including functional groups is copolymerized to the above-mentioned acrylic based polymer is used as base polymers, and preferably cross-linking agents for cross-linking with the functional groups of the monomers including functional groups may be blended.

As monomers having functional groups, monomers including carboxyl groups, hydroxyl groups, epoxy groups, amino groups etc. may be mentioned.

As monomers having carboxyl groups, acrylic acid, methacrylic acid, fumaric acid, maleic acid, itaconic acid, etc. may be mentioned.

As monomers having hydroxyl groups, there may be mentioned: 2-hydroxyethyl (meth)acrylate, hydroxybutyl (meth) acrylate, hydroxyhexyl (meth)acrylate, and N-methylol (meth) acrylamide etc. and as monomers including epoxy groups there may be mentioned glycidyl (meth)acrylate etc.

Also monomers including N element may be copolymerized with the above-mentioned acrylic based polymers. As monomers including N element, there may be mentioned: (meth)acrylamide, N,N-dimethyl (meth) acrylamide, N,N-diethyl (meth)acrylamide, (meth)acryloyl morpholine, (meth)acetonitrile, vinyl pyrrolidone, N-cyclohexyl maleimide, itaconimide, N,N-dimethylaminoethyl (meth) acrylamide etc. In addition, vinyl acetate, styrene, etc. may further be used for acrylic based polymers in a range not impairing, performance of adhesives. These monomers may be used independently, and two or more of them may be used in combination.

Although a percentage of the above-mentioned copolymerizable monomer in acrylic based polymers is not especially limited, it is preferably approximately 0.1 through 12 parts by weight, and more preferably 0.5 through 10 parts by weight to alkyl (meth)acrylate 100 parts by weight.

As cross-linking agents, epoxy based cross-linking agents, isocyanate based cross-linking agents, imine based cross-linking agents, metal chelate based cross-linking agents, etc. may be mentioned. Moreover, as cross-linking agents, polyamine compounds, melamine resins, urea resins, epoxy resins, etc. may be mentioned. Among cross-linking agents, epoxy based cross-linking agents are preferred. Although a mixing percentage of the cross-linking agent to the acrylic based polymers is not especially limited, an amount of the cross-linking agent (solid content) is preferably approximately 0.01 through 10 parts by weight to the acrylic based polymer (solid content) 100 parts by weight.

Furthermore, tackifiers, plasticizers, fillers, antioxidants, UV absorbents, silane coupling agents, etc. may also be suitably used for the above-mentioned adhesives, if needed.

Methods for forming the adhesive layer 1b is not especially limited, and following methods may be mentioned:

(transfer method) a method in which a adhesive is applied to a siliconized polyester film, and is transferred onto a base material film 1a after dryed;
(direct method) a method in which an adhesive composition is directly applied to a base material film 1a, and then dried; and
a method using a co-extrusion process.

A thickness of the adhesive layer 1b is not especially limited, and it is preferably about 1 through 50 μm, more preferably about 2 through 40 μm, and still more preferably about 3 through 30 μm. An excessively thin thickness of the adhesive layer 1b makes formation of applied layers difficult, and also tends to make adhesive powers inadequate. On the contrary, an excessively large thickness tends to generate paste remainder, and there is tendency of causing disadvantage in cost.

In addition, the above-mentioned adhesive layer 1b of the surface protective film 1 of this invention may be protected with separator, and the surface protective film 1 of this invention may be given a treatment for separation on a surface opposite to a surface on which a adhesive layer 1b is formed of the base material film 1a using silicone based releasing agents or long chain alkyl based releasing agents, and then it may be rolled up. Besides, a treatment for rough-surfacing by buffing, sandblasting, etc. may be provided to a surface opposite to a surface on which the adhesive layer 1b is formed of the base material film 1a in order to raise sliding property etc. Furthermore, antistatic treatment may be provided to the surface protective film 1 by usual way for prevention of dust contamination etc.

On the other hand, a transparent conductive film 2 protected by a surface protective film 1 of this invention is shown in FIG. 1 or 2. That is, as shown in FIG. 1, a transparent conductive film with a surface protective film of this invention comprises a conductive thin film 2b on one side, and a hard coat layer 2c (or an anti-glare layer) on the other side of a substrate film 2a, and at the same time an adhesive layer 1b of a surface protective film 1 attached on a surface of the hard coat layer 2c (or the anti-glare layer). Alternatively, as shown in FIG. 2, a transparent conductive film with a surface protective film of this invention comprises a conductive thin film 2b on one side of a substrate film 2a, and at the same time an adhesive layer 1b of a surface protective film 1 attached on a surface on the other side of the substrate film 2a. Besides, a transparent conductive film with a surface protective film of this invention may comprise a adhesive layer 1b of the above-mentioned surface protective film 1 attached on a surface on a side of the conductive thin film 2b.

The conductive thin film 2b is formed with thin film of metal oxides, such as ITO (oxide of indium and tin) oxide of tin-antimony, zinc, tin and the like, and ultra-thin film of metals, such as gold, silver, palladium, and aluminum. These are formed by a vacuum deposition method, an ion beam deposition method, a sputtering method, an ion plating method, etc. Although a thickness of the conductive thin film 2b is not especially limited, it is in general no less than 50 Å, and preferably 100 through 2,000 Å.

As the substrate film 2a, a film or a glass comprising transparent materials is usually used. As examples of the film, for example, polyesters, such as polyethylene terephthalates and polyethylene naphthalates; polymethylmethacrylates; styrene based polymers, such as polystyrenes and acrylonitrile styrene copolymers (AS resins); polycarbonates etc. may be mentioned. And there also may be mentioned: polyethylenes, polypropylenes, polyolefins having cyclo based or norbornene structure; polyolefins like ethylene propylene copolymers; vinyl chloride based polymers; amide based polymers, such as nylons and aromatic polyamides; imide based polymers; sulfone based polymers; polyethersulfone based polymers; polyetheretherketone based polymers; polyphenylene sulfide based polymers; vinyl alcohol based polymers; vinylidene chloride based polymers; vinyl butyral based polymers; allylate based polymers; polyoxymethylene based polymers; epoxy based polymers; and blended materials of the above-mentioned polymers.

Although a thickness of the substrate film 2a is not especially limited, it is in general approximately 20 through 300 μm, and preferably 30 through 200 μm.

As the hard coat layer 2c, other than layers having only hard coat function, a layer simultaneously having anti-glare function, a layer in which an anti-glare layer may be formed on the surface of a hard coat layer 2c.

As hard coat agents used, usual coating materials of ultraviolet radiation (UV) and electron rays curing type, silicone based hard coat agents, and phosphazene resin based hard coat agents etc. may be used, and in view of material cost, easiness in process, free selection of composition, etc. coating materials of UV curing type are preferable. The coating materials of UV curing type include vinyl polymerizable type, polythiol-polyene type, epoxy type, and amino-alkyd type, and they also may be classified into type of alkyd, polyester, polyether, acrylic, urethane, and epoxy according to types of prepolymer, any types of which may be usable.

Besides, an anti-glare layer represents a layer having functions, such as prevention of dazzling, and antireflection. Specifically, for example, a layer using a refractive index difference between layers, a layer using a refractive index difference between fine-grains included and a polymer forming the layer, a layer that has detailed valleys and peaks form on a surface thereof may be mentioned.

A transparent conductive film 2 of this invention may be used for new display methods, such as liquid crystal displays, plasma display panels, and electroluminescence displays, for transparent electrode in touch panels, sensors, solar cells, etc., and further for electrification prevention of transparent articles, electromagnetic wave interception, etc.

DESCRIPTION OF THE PREFERRED EMBODIMENTS

Hereinafter, description will be given for Examples showing concrete constitution and effect of this invention.

[Preparation of an Acrylic Based Adhesive]

Using a commonly used method, 2-ethylhexyl acrylate (96 moles) and hydroxyethyl acrylate (4 moles) were copolymerized in ethyl acetate, and a solution of an acrylic based copolymer having a weight average molecular weight of 700,000 (polystyrene converted) was obtained. Collonate L (manufactured by Nippon Polyurethane Industry Co., Ltd.) 3 parts by weight as an isocyanate based cross-linking agent was added into acrylic based copolymer 100 parts by weight (solid content), and subsequently it was diluted with ethyl acetate, and an adhesive composition including 20% by weight of solid content was obtained.

EXAMPLE 1

The above-mentioned acrylic based adhesive composition was applied to a corona treated surface of a polyethylene terephthalate (PET) film (Diafoil T100C, manufactured by Mitsubishi Chemical Polyester Film Co., Ltd., surface treatment: corona treatment, density: 1.4 g/cm$^3$ (based on JIS 7112)) with a thickness of 38 μm. Then a drawing tension per PET film width of 1 m was set to 30 N, and the film was kept for 1 minute under 145° C. conditions to perform a treatment for removing a residual stress of the PET film with simultaneous drying of the adhesive. Subsequently, the film was winded to a shape of a roll, and a surface protective film with a thickness of the adhesive layer of 20 μm was obtained. Furthermore, aging treatment was performed for the surface protective film obtained under 50° C. conditions for 48 hours.

EXAMPLE 2

The above-mentioned acrylic based adhesive composition was applied onto one side of a polyethylene naphthalate (PEN) film (manufactured by Teijin Du Pont Films Japan Limited, Kaladex 2000, no surface treatment given, density: 1.36 g/cm$^3$ (based on JIS 7112)) with a thickness of 25 μm. Then a drawing tension per PEN film width of 1 m was set to 30 N, and the film was kept for 3 minute under 80° C. conditions to perform a treatment for removing a residual stress of the PEN film with simultaneous drying of the adhesive. Subsequently, the film was winded to a shape of a roll, and a surface protective film with a thickness of the adhesive layer of 20 μm was obtained. Furthermore, aging treatment was performed for the surface protective film obtained under 50° C. conditions for 48 hours.

COMPARATIVE EXAMPLE 1

The above-mentioned acrylic based adhesive composition was applied to a corona treated surface of the PET film given in Example 1, and the film was kept to stand for 3 minutes under 80° C. conditions. Subsequently, the film was winded to a shape of a roll, and a surface protective film with a thickness of the adhesive layer of 20 μm was obtained. Furthermore, aging treatment was performed for the surface protective film obtained under 50° C. conditions for 48 hours.

COMPARATIVE EXAMPLE 2

The above-mentioned acrylic based adhesive composition was applied to one side of a PET film (manufactured by Teijin Du Pont Films Japan Limited, Tetoron film S-25, no surface treatment given, density: 1.4 g/cm$^3$ (based on JIS 7112)) with a thickness of 25 μm, and the film was kept to stand for 3 minutes under 80° C. conditions. Subsequently, the film was winded to a shape of a roll, and a surface protective film with a thickness of the adhesive layer of 20 μm was obtained. Furthermore, aging treatment was performed for the surface protective film obtained under 50° C. conditions for 48 hours.

Following evaluation test was performed using the surface protective film obtained in Examples and Comparative examples. And existence of curling occurrence of only transparent conductive film without a surface protective film was evaluated in Comparative example 3.

[Evaluation Test]

(1) Rate of Thermal Shrinkage

A surface protective film was cut into a square of 50×50 mm, to which straight lines with a length of 40 mm were given in a machine direction (MD) and a width direction (TD) to form a shape of a cross mark. Lengths (mm) of the above-mentioned cross mark before and after of heating preservation test (150° C., 1 hour) were measured, using Olympus digital type small quantitative microscope STM 5 (manufactured by Olympus Optical Industry Co., Ltd.). Measured values were substituted in a following equation, and rates of thermal shrinkage were obtained. Table 1 shows results.

Rate of thermal shrinkage (%)={(length before heating preservation)−(length after heating preservation)/(length before heating preservation)}×100

(2) Curling Evaluation after Heating Preservation of a Transparent Conductive Film A surface protective film was attached with a hand roller on a side of a base material film of a transparent conductive film (base material film: PET, conductive thin film: indium-tin metal oxide, trade name: Elecrysta G400LTMP, manufactured by NITTO DENKO Corporation) Existence of curling occurrence after heating preservation of 150° C.×1 hour was observed by visual inspection. Table 1 shows results.

TABLE 1

| | Rate of thermal shrinkage (%) | | |
|---|---|---|---|
| | MD | TD | Curling |
| Example 1 | 0.5 | 0 | Not observed |
| Example 2 | 0.4 | 0 | Not observed |
| Comparative example 1 | 1.0 | 0.2 | Observed |
| Comparative example 2 | 1.5 | 0.3 | Observed |
| Comparative example 3 | — | — | Not observed |

When a surface protective film having a rate of thermal shrinkage in a specific range by this invention is used, as the results of Table 1 show, after a transparent conductive film with a surface protective film attached thereon is introduced in a heating process of about 150° C., the transparent conductive film does not demonstrate large curling.

What is claimed is:

1. A method for manufacturing a surface protective film for transparent conductive films having a rate of thermal shrinkage of no more than 0.9% in both MD (machine direction) and TD (width direction) as measured after being heated at 150° C. for 1 hour, said method comprising:
    providing a base material film;
    applying an adhesive on one surface of the base material film; and
    applying a drawing tension of no more than 80 N per width of 1 m of the base material film under conditions of a temperature of 100° C. through 150° C. and a residence time of 20 through 120 seconds, thereby removing a residual stress and simultaneously drying the adhesive.

2. The method according to claim 1, wherein as the base material film, a film comprised of a resin selected from the group consisting of polyethylene terephthalates and polyethylene naphthalates is selected.

3. The method according to claim 1, wherein the applied drawing tension is no more than 60 N per width of 1 m of the base material film under conditions of a temperature of 120° C. through 150° C. and a residence time of 40 through 120 seconds.

4. The method according to claim 3, wherein the applied drawing tension is no more than 30 N per width of 1 m of the base material film.

5. The method according to claim 4, wherein the applied drawing tension is substantially 0 N per width of 1 m of the base material film.

6. The method according to claim 3, wherein the residence time for applying the drawing tension is at least 60 seconds.

7. A method for manufacturing a transparent conductive film with a surface protective film, comprising:
    providing a base material film;
    forming a conductive thin film on one surface of the base material film;
    forming a hard coat layer or an anti-glare layer on the other surface of the base material film;
    providing the surface protective film according to claim 1; and
    attaching the adhesive layer of the surface protective film on a surface of the hard coat layer or the anti-glare layer or a surface of the conductive thin film.

8. The method according to claim 7, wherein as the base material film of the surface protective film, a film comprised of a resin selected from the group consisting of polyethylene terephthalates and polyethylene naphthalates is selected.

9. A method for manufacturing a transparent conductive film with a surface protective film, comprising:
    providing a base material film;
    forming a conductive thin film on one surface of the base material film;
    providing the surface protective film according to claim 1; and
    attaching the adhesive layer of the surface protective film on a surface of the conductive thin film.

10. The method according to claim 9, wherein as the base material film of the surface protective film, a film comprised of a resin selected from the group consisting of polyethylene terephthalates and polyethylene naphthalates is selected.

* * * * *

UNITED STATES PATENT AND TRADEMARK OFFICE
CERTIFICATE OF CORRECTION

PATENT NO. : 7,408,604 B2
APPLICATION NO. : 11/189523
DATED : August 5, 2008
INVENTOR(S) : Shinichi Takada et al.

Page 1 of 1

It is certified that error appears in the above-identified patent and that said Letters Patent is hereby corrected as shown below:

At Column 5, Line 4, please delete "acrylatel," and insert --acrylate,--, therefor.

At Column 5, Line 60, please delete "dryed;" and insert --dried;--, therefor.

At Column 8, Line 60, after "100" please insert --.--.

Signed and Sealed this

Thirty-first Day of March, 2009

JOHN DOLL
*Acting Director of the United States Patent and Trademark Office*